(12) United States Patent
Ohmura et al.

(10) Patent No.: US 9,803,741 B2
(45) Date of Patent: Oct. 31, 2017

(54) LUBRICATING STRUCTURE FOR DIFFERENTIAL DEVICE

(71) Applicant: HONDA MOTOR CO., LTD., Tokyo (JP)

(72) Inventors: Jun Ohmura, Saitama (JP); Yuichi Suenaga, Saitama (JP); Kouji Ono, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/122,783

(22) PCT Filed: Feb. 20, 2015

(86) PCT No.: PCT/JP2015/054808
§ 371 (c)(1),
(2) Date: Aug. 31, 2016

(87) PCT Pub. No.: WO2015/137091
PCT Pub. Date: Sep. 17, 2015

(65) Prior Publication Data
US 2017/0102065 A1 Apr. 13, 2017

(30) Foreign Application Priority Data
Mar. 10, 2014 (JP) .................................. 2014-046722

(51) Int. Cl.
*F16H 57/04* (2010.01)
*F16H 48/42* (2012.01)

(52) U.S. Cl.
CPC ......... *F16H 57/0423* (2013.01); *F16H 48/42* (2013.01); *F16H 57/045* (2013.01);
(Continued)

(58) Field of Classification Search
CPC ............. F16H 57/0423; F16H 57/0471; F16H 57/0409; F16H 57/045; F16H 2048/423; F16H 57/0483
(Continued)

(56) References Cited

U.S. PATENT DOCUMENTS 3,741,343 A * 6/1973 Lindenfeld ............. F16H 48/06
184/11.2
5,709,135 A * 1/1998 Baxter ................... B60K 17/20
475/160
(Continued)

FOREIGN PATENT DOCUMENTS

DE  10 2012 004 279 A1  5/2013
EP      1 918 613 A2     5/2008
(Continued)

OTHER PUBLICATIONS

Japanese Office Action application No. 2015-224696 dated Sep. 27, 2016.
(Continued)

*Primary Examiner* — Roger L Pang
(74) *Attorney, Agent, or Firm* — Squire Patton Boggs (US) LLP

(57) ABSTRACT

A lubricating structure for a differential device includes a pair of baffle plates, fixed to a transmission case, partitioning an internal space between the transmission case, and a differential case and a final driven gear and a second space. The inner surface of the baffle plates has a portion on the first space side that is enlarged to be similar in shape to outer surfaces of rotating bodies defined by trajectories of the differential case and the final driven gear rotated around a rotational axis of inboard shafts. The baffle plates are configured such that the amount of lubricating oil accumulating in the first space is smaller than that in the second
(Continued)

space. A through-hole is provided at a position to secure a level of lubricating oil.

7 Claims, 3 Drawing Sheets

(52) U.S. Cl.
CPC ..... *F16H 57/0409* (2013.01); *F16H 57/0447* (2013.01); *F16H 57/0471* (2013.01); *F16H 57/0483* (2013.01); *F16H 2048/423* (2013.01)

(58) Field of Classification Search
USPC ........................................... 475/160
See application file for complete search history.

(56) References Cited

U.S. PATENT DOCUMENTS

| | | | | |
|---|---|---|---|---|
| 6,502,665 | B1 * | 1/2003 | Brehob | F16H 57/0483 184/11.2 |
| 8,409,044 | B2 * | 4/2013 | Hilker | F16H 57/0483 475/160 |

FOREIGN PATENT DOCUMENTS

| | | |
|---|---|---|
| JP | 1982-000157 | 1/1982 |
| JP | 05-106710 A | 4/1993 |
| JP | 10-306868 A | 11/1998 |
| JP | 2006-275164 A | 10/2006 |
| JP | 2008-138780 A | 6/2008 |
| JP | 2011-256918 A | 12/2011 |
| WO | WO2008099268 A1 * | 8/2008 |
| WO | WO2015146750 A1 * | 10/2015 |

OTHER PUBLICATIONS

International Search Report dated May 26, 2015 corresponding to International Patent Application No. PCT/JP2015/054808 and English translation thereof.

Decision to Grant a Patent dated Oct. 20, 2015 corresponding to Japanese Patent Application No. 2015-533768.

* cited by examiner

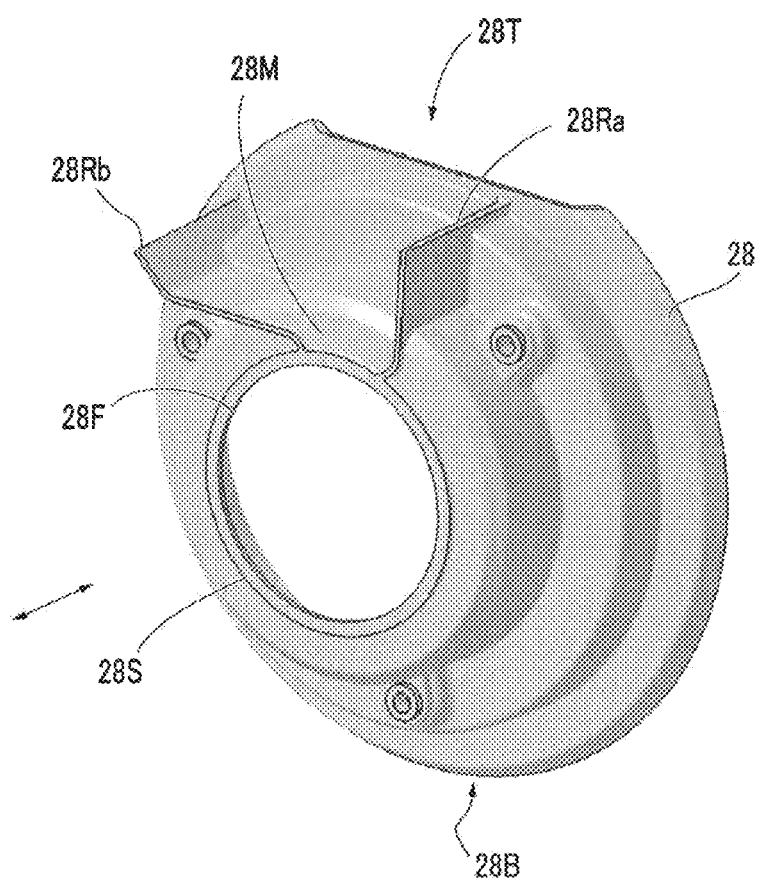

LUBRICATING STRUCTURE FOR DIFFERENTIAL DEVICE

TECHNICAL FIELD

The present invention relates to a lubricating structure for lubricating a differential device installed in a vehicle.

BACKGROUND ART

A differential device installed in a vehicle includes a differential case that is rotatably housed inside a transmission case through bearings. Inside the transmission case, a drive pinion gear driving the differential case is rotatably housed, and the drive pinion gear is fixed on the outer side of the differential case so as to mesh with a final driven gear.

The differential case includes built-in parts, such as a pinion gear, a pinion shaft, and a side gear, a pair of inboard shafts that distribute a driving torque from the final driven gear to the outside, and inboard parts with a spiral oil guide groove that rotatably support the inboard shafts inside the transmission case. In a lubricating structure for such a differential device, it is important to maintain the inboard parts, the inside of the differential case, and the bearings supporting the differential case in a well-lubricated state.

Generally, lubricating oil is retained in a bottom part of the transmission case, and as the final driven gear scoops up, while agitating, the lubricating oil when the vehicle is traveling, the inside of the case is maintained in a lubricated state. There is a known lubricating structure having a guide groove which is formed in the inner surface of the transmission case and through which lubricating oil scooped up by the final driven gear is guided to the inboard parts and the bearings. Another known lubricating structure has bearing spacers and a guide plate provided on the outer side of the bearings, by which dripping lubricating oil is guided to the outer side of the inboard parts and the bearings (e.g., see Patent Literature 1).

CITATION LIST

Patent Literature

Patent Literature 1: Japanese Patent Laid-Open No. 2008-138780

SUMMARY OF INVENTION

Technical Problem

A conventional common differential case has a window hole bored toward the outer circumferential side. This window hole is provided to discharge lubricating oil having been conducted from the inboard parts into the differential case while the vehicle is traveling and to immerse the parts inside the differential case in the lubricating oil even during a halt of the vehicle. In this case, a large amount of lubricating oil is required inside the transmission case so as to maintain an oil level high enough for the built-in parts of the differential case to be immersed in the lubricating oil through the window hole. However, then the final driven gear and the differential case have to agitate a larger amount of lubricating oil, and thus encounter a higher agitation resistance, while the vehicle is traveling.

In the case where lubricating oil is guided to the outer side, i.e., the rear side, of the bearings and the inboard parts, a larger amount of lubricating oil flows through the clearance between the inner race and the outer race of the bearings to the outside of the differential case, which results in a relative decrease in amount of lubricating oil supplied from the inboard parts into the differential case.

Having been devised in view of these points, the present invention aims to provide a lubricating structure for a differential device that can reduce the agitation resistance of lubricating oil with respect to the final driven gear and the differential case, and allows an efficient inflow of lubricating oil from the open ends of the inboard parts of the differential case.

Solution to Problem

According to the present invention, there is provided a lubricating structure for a differential device including:

a differential case having a pair of inboard parts that rotatably support a pair of inboard shafts;

a final driven gear mounted to the differential case;

a transmission case housing the differential case and the final driven gear; and a pair of bearings that support the pair of inboard parts inside the transmission case, and support the final driven gear and the differential case such that the final driven gear and the differential case are rotatable relative to the transmission case around a rotational axis of the pair of inboard shafts, the lubricating structure being configured to supply lubricating oil from the pair of inboard parts and the pair of bearings into the transmission case, wherein the lubricating structure includes a pair of baffle plates that are fixed to the transmission case so as to partition an internal space between the transmission case on one side and the differential case and the final driven gear on the other side into a first space on a side of the differential case side and the final driven gear and a second space on a side of the transmission case, each of the pair of baffle plates has an annular mounting surface that comes into liquid-tight contact with an inner surface of the transmission case around an outer race of the bearing, and an inner surface including a portion on the first space side that is enlarged in such a manner as to be similar in shape to outer surfaces of rotating bodies defined by trajectories of the differential case and the final driven gear being rotated around the rotational axis of the inboard shaft, the pair of baffle plates are configured such that an amount of lubricating oil accumulating in the first space is smaller than an amount of lubricating oil accumulating in the second space, and the differential case has a through-hole parallel to the rotational axis of the pair of inboard shafts, and the through-hole is provided at a position that a level of lubricating oil can be secured inside the differential case.

According to the lubricating structure for a differential device of the present invention, splash of lubricating oil from the first space to the second space can be partially limited. The amount of lubricating oil to be agitated by the rotation of the differential case and the final driven gear is secured only in the first space on the inner side of the baffle plates. Thus, the agitation resistance can be reduced, as well as the cooling effect can be enhanced as the final driven gear remains in contact with lubricating oil for a prolonged time.

The lubricating oil accumulating in the second space located on the outer side of the baffle plates inside the transmission case is not agitated, and therefore does not constitute a resistance. Accordingly, the oil level in that part can be set to a high level to increase the total amount of lubricating oil, so that the cooling performance can be improved by virtue of the larger heat mass.

The present invention eliminates the need to supply lubricating oil into the differential case from some part other than the clearance around the inboard shafts. Thus, the level of lubricating oil from the bottom part of the differential case around the final driven gear can be set to a low level, and thereby the agitation resistance to the rotation of the final driven gear can be further reduced.

In the lubricating structure for a differential device of the present invention, at least one of the pair of baffle plates can have a rib that forms a chamber, serving as an oil reservoir, across the transmission case at the upper side of the pair of bearings, and the oil reservoir can communicate with the pair of inboard parts and the pair of bearings.

According to this configuration, the number of the parts can be reduced as the oil reservoir for supplying lubricating oil can be formed by the baffle plate itself. Moreover, the amount of lubricating oil supplied to the inboard parts can be increased, as a part of the lubricating oil supplied to the outer side of the pair of baffle plates is supplied to the oil reservoir.

BRIEF DESCRIPTION OF DRAWINGS

FIG. 3 is a perspective view showing an outer surface of the baffle plate.

DESCRIPTION OF EMBODIMENT

Figure 1:
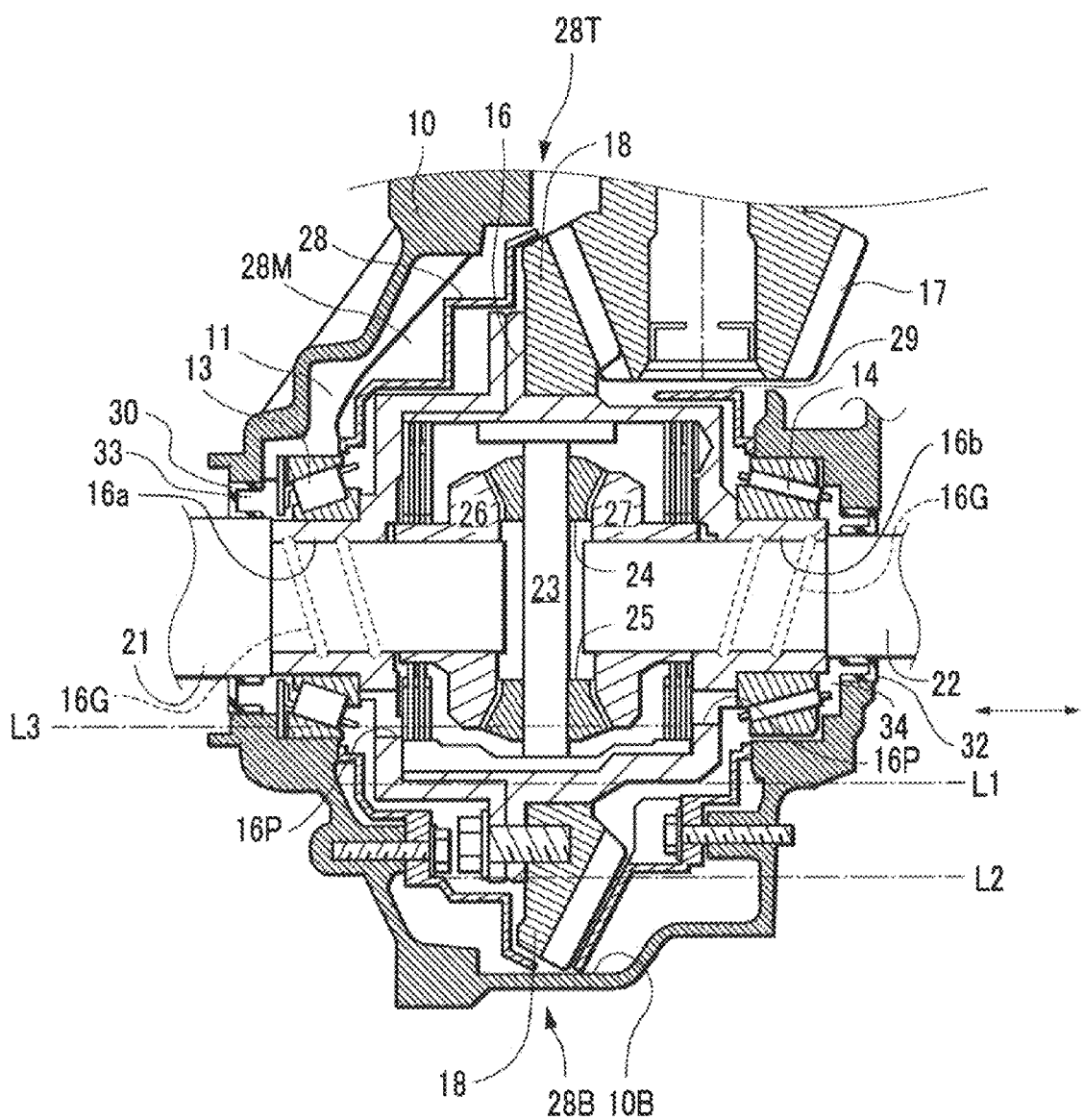
FIG. 1 is a sectional side view showing a differential device including a lubricating structure of an embodiment of the present invention.

FIG. 1 shows a differential device including a lubricating structure of an embodiment of the present invention. In FIG. 1, only a part of the differential device is shown.

The differential device shown in FIG. 1 includes a transmission case 10, and a substantially columnar differential case 16 that is rotatably supported through a pair of bearings 13, 14 in the internal space of the transmission case 10.

Inside the transmission case 10, a drive pinion gear 17 driven by an external transmission device is rotatably housed, and a final driven gear 18 (ring gear) meshing with the drive pinion gear 17 is fixed with a plurality of bolts to the differential case 16 so as to surround the outer circumference of the differential case 16.

The differential case 16 has a pair of cylindrical inboard parts 16a, 16b that extend coaxially in the vehicle left-right direction from both end faces of the differential case 16. The differential case 16 is supported on the inner races of the pair of bearings 13, 14 respectively through the outer circumferential surfaces of the inboard parts 16a, 16b.

The bearings 13, 14 are fixed at the outer races to the transmission case 10. The bearings 13, 14 are tapered roller bearings with rollers disposed such that the axial direction thereof is inclined relative to the axial direction of the inboard parts 16a, 16b.

The shaft end of the left inboard shaft 21 is rotatably supported on the inner circumferential surface of the left-side inboard part 16a, while the shaft end of the right inboard shaft 22 is rotatably supported on the inner circumferential surface of the right-side inboard part 16b so as to be coaxial with the left inboard shaft 21.

In the following description, the axial direction refers to the direction of the rotational axis of the left inboard shaft 21 and the right inboard shaft 22 (the direction of the double-headed arrow in FIG. 1).

The inner circumferential surface of each of the inboard parts 16a, 16b has a spiral oil supply groove 16G that extends spirally from the opening at the end of each of the inboard parts toward the inside of the differential case 16. Lubricating oil from the outside is supplied through the spiral grooves 16G in the inner circumferential surfaces of the inboard parts 16a, 16b into the differential case 16 as the differential case 16 rotates relative to the inboard shafts 21, 22.

Inside the differential case 16, a pinion shaft 23 is fixedly supported at both ends thereof so as to be located between the opposite ends of the inboard shafts 21, 22 with an interval and to be orthogonal to the axis of both of the inboard shafts 21, 22. The point of intersection between the axis of the inboard shafts 21, 22 and the axis of the pinion shaft 23 will be referred to as the center of a differential mechanism.

A pair of pinion gears 24, 25 are rotatably supported at the respective ends of the pinion shaft 23. Both of the pinion gears 24, 25 are slidable with the rear surfaces thereof on the inner surface of the differential case 16, and are respectively in mesh with a pair of side gears 26, 27.

The pair of side gears 26, 27 are respectively spline-coupled to the opposite ends of the left inboard shaft 21 and the right inboard shaft 22. Both pairs of pinion gears 24, 25 and side gears 26, 27 are disposed symmetrically around the center of the differential mechanism.

An oil drain hole 16P that is an open through-hole parallel to the axial direction is provided in each side surface of the differential case 16, within a region from the rotational axis away from the bearings 13, 14 and not reaching the outer circumferential surface of the differential case 16. Thus, lubricating oil introduced from the inboard parts 16a, 16b can be accumulated inside the differential case 16 to a predetermined amount (to the depth up to the inner circumferential surface of the differential case 16). A lubricating oil communication hole penetrating the outer circumferential surface of the differential case 16, or a lubricating oil communication hole penetrating along the inner circumferential surface (bottom) of the differential case 16 in parallel thereto, would make it impossible to secure the predetermined amount of lubricating oil and is therefore not provided.

For example, as shown in FIG. 1, the oil drain hole 16P in the side surface is formed at such a position that a level (L3) of the lubricating oil can be secured at which a sliding portion of the rear surface of the pinion gear 25 is immersed inside the differential case 16. Thus, even during a halt of the vehicle when lubricating oil is not newly supplied into the differential case 16 or during a straight forward motion of the vehicle when relative rotation of the inboard shafts 21, 22 and the differential case 16 does not occur, oil is accumulated up to the sliding portion of the rear surface of the pinion gear 25, so that the lubricating oil can be secured from the start of turning when the pinion gear 25 starts to rotate on its own axis.

The differential device further includes baffle plates 28, 29 respectively inside the left and right internal spaces between the transmission case 10 and the differential case 16.

The pair of baffle plates 28, 29 are provided so as to partition the left and right internal spaces of the transmission case 10 into the side of the differential case 16 and the final driven gear 18 (first space) and the side of the transmission case 10 (second space).

The left-side baffle plate 28 is fixed with a plurality of bolts to the transmission case 10 such that an annular mounting surface on the inner circumferential side thereof comes into liquid-tight contact with the inner surface (mating surface) of the transmission case 10 at the circumferential edge of the outer race of the left-side bearing 13. The outer circumference of the left-side baffle plate 28 is enlarged so as to cover the part from the outer surface of the differential case 16 to the rear side of the tooth flank of the final driven gear 18 while retaining the first space.

Similarly, the right-side baffle plate 29 is fixed with a plurality of bolts to the transmission case 10 such that an annular mounting surface on the inner circumferential side thereof comes into liquid-tight contact with the inner surface (mating surface) of the transmission case 10 at the circumferential edge of the outer race of the right-side bearing 14. The outer circumference of the right-side baffle plate 29 is enlarged so as to cover the part from the outer surface of the differential case 16 to the tooth flank of the final driven gear 18 (except for the portion interfering with the drive pinion gear 17) while retaining the first space.

Except that at least openings 28B, 28T are respectively formed in a bottom part 10B of the transmission case 10 and on the upper side from the differential case 16, the mating surfaces (not shown) of the left and right baffle plates 28, 29 at the circumferential edges are in contact with each other. The upper opening 28T includes an opening in which the drive pinion gear 17 and the final driven gear 18 mesh with each other.

When lubricating oil is retained in the bottom part 10B of the transmission case 10 and the rotating final driven gear 18 scoops up the lubricating oil, scattering of the splashed lubricating oil to the inner surface of the transmission case 10 is partially limited by the opening 28T of the pair of baffle plates 28, 29. However, the splashed lubricating oil scatters to the inner surface of the transmission case 10 through the opening of the baffle plates in the vicinity of where the drive pinion gear 17 and the final driven gear 18 mesh with each other.

The lower opening 28B of the pair of baffle plates 28, 29 partially limits the amount of lubricating oil supplied to the final driven gear 18 from the lubricating oil retained in the entire bottom part 10B of the transmission case 10.

The lubricating oil that has scattered through the upper opening 28T to the inner surface of the transmission case 10 passes over the inner surface of the transmission case 10 and reaches the rotating left and right inboard shafts 21, 22. Therefore, to prevent outflow of the lubricating oil, predetermined outer circumferential surfaces of the inboard shafts 21, 22 are liquid-tightly sealed.

A left-side oil seal 30 is liquid-tightly provided between the left inboard shaft 21 protruding to the outside and the opening of the transmission case 10. Similarly, an oil seal 32 is liquid-tightly provided between the right inboard shaft 22 and the opening of the transmission case 10.

The opening of the transmission case 10 through which the left inboard shaft 21 protrudes is formed such that an annular space 33 (annular groove) is defined between the left-side bearing 13 and the oil seal 30.

A lubricating oil guide groove 11 is formed in the inner surface of the transmission case 10 on the left side, at the upper side from the bearing 13. The lubricating oil guide groove 11 is a groove that collects the lubricating oil having been scooped up by the final driven gear 18 and hit the inner surface of the transmission case 10 through the opening 28T, and the like. and guides the lubricating oil toward the annular space 33 of the annular groove.

Similarly, the opening of the transmission case 10 through which the right inboard shaft 22 protrudes is formed such that an annular space 34 (annular groove) is defined between the right-side bearing 14 and the oil seal 32. A lubricating oil guide groove (not shown) is provided in the inner surface of the transmission case 10 on the right side such that the lubricating oil is supplied to the annular groove 34.

Figure 2:
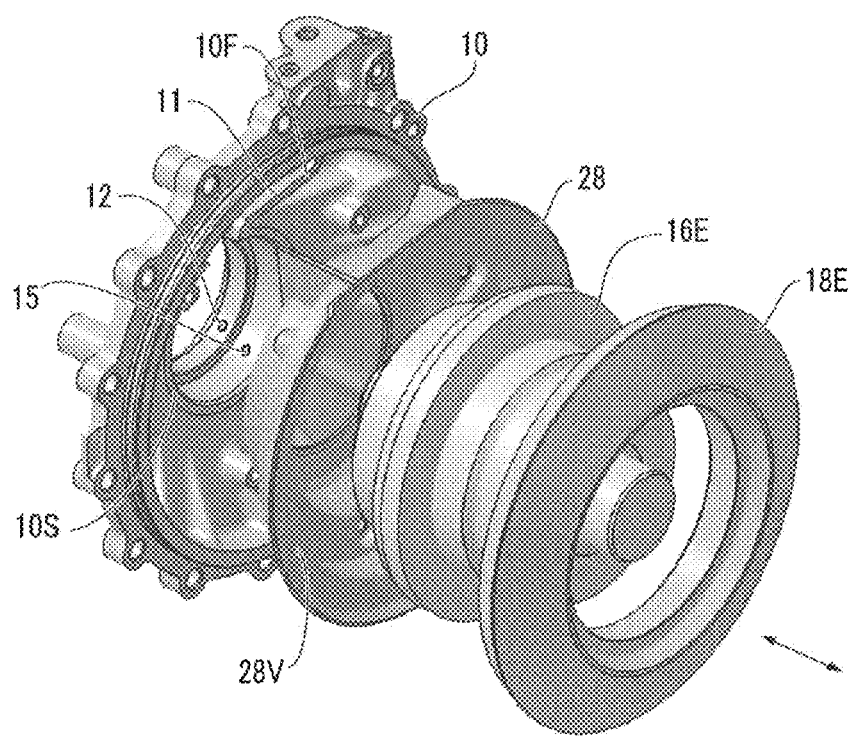
FIG. 2 is an exploded view showing the structure of a part of a transmission case, a baffle plate, a differential case, and a final driven gear.

FIG. 2 is an exploded view of the structure of a part (transmission cover) of the transmission case 10 on the left side, the baffle plate 28, a differential case 16E, and a final driven gear 18E, as seen from a higher perspective on the right side. The differential case 16E and the final driven gear 18E are depicted as rotating bodies defined by the trajectories of the differential case 16 and the final driven gear 18 being rotated around the inboard shaft (not shown) extending in the axial direction.

As shown in FIG. 2, the inner surface of the baffle plate 28 is shaped so as to face the differential case 16 and the final driven gear 18, and the inner surface, except for mounting bolt portions of the baffle plate, is shaped so as to smoothly and evenly follow the shapes of the differential case 16 and the final driven gear 18 (the inner surface has the shape of a bowl-like rotating body around the rotational axis of the inboard shaft).

Specifically, the inner surface of the baffle plate 28 includes a portion (28V) that is enlarged in such a manner as to be similar in shape to the outer surfaces of the rotating bodies defined by the trajectories of the opposite differential case 16 and final driven gear 18 being rotated around the rotational axis of the inboard shaft. Although not shown, the baffle plate 29 (see FIG. 1) is formed similarly to the baffle plate 28.

Returning to FIG. 1, the baffle plates 28, 29 are each fastened with bolts to the transmission case 10 such that the inner surface of each of the baffle plates 28, 29 faces the outer surfaces of the rotating bodies of the differential case 16 and the final driven gear 18 with a certain clearance kept therebetween. Thus, the flow of lubricating oil becomes more laminar and smooth, so that the agitation resistance of the lubricating oil inside the first space between the pair of baffle plates can be reduced.

The clearance between the baffle plate 28 and the differential case 16 is set to 3 mm or less in nominal dimension (same for the side of the baffle plate 29). The lubricating oil having passed through the bearing 13 (mainly the lower half of the bearing 13) flows into the gap between the baffle plate 28 and the differential case 16. By thus setting the clearance between the baffle plate 28 and the differential case 16 (on the bearing side of the first space), which is the area of the outlet for the lubricating oil having passed through the bearing 13, to a small dimension, it is possible to reduce the amount of lubricating oil passing through the bearing 13 and relatively increase the amount of oil supplied from the inboard part 16a into the differential case 16.

The clearance between the baffle plate 28 and the final driven gear 18 is set to 3 mm or less in nominal dimension (same for the side of the baffle plate 29) to narrow the first space. Thus, when the final driven gear 18 rotates, the lubricating oil is more likely to follow the final driven gear 18 and rotate on the inner side of the baffle plate 28, so that the final driven gear 18 can remain in contact with the lubricating oil for a prolonged time. As a result, the heat dissipation effect of the lubricating oil on the final driven gear 18 can be improved.

Referring back to FIG. 2, the lubricating oil guide groove 11, defined between a pair of ribs 10F (one of the ribs is not shown), is formed in the inner surface of the transmission case 10.

An inner circumferential wall 12 of a circular opening on which the oil seal 30 (see FIG. 1) is mounted, and a seating part 15 on which the outer race of the bearing 13 (see FIG. 1) is mounted are provided in a part of the inner surface of the transmission case 10 corresponding to the left inboard shaft 21 (see FIG. 1).

The top surfaces of the pair of ribs 10F of the lubricating oil guide groove 11 of the transmission case 10 and an annular inner surface 10S around the seating part 15 for the bearing 13 are integrally formed as a mating surface mating with the baffle plate 28.

FIG. 3 is a perspective view showing the outer surface of the baffle plate 28, with the baffle plate 28 seen from a higher perspective on the left side. As shown in FIG. 3, a pair of ribs 28Ra, 28Rb are formed on the outer surface of the baffle plate 28 on the upper side from the bearing 13 (see FIG. 1).

The pair of ribs 28Ra, 28Rb integrally with the pair of ribs 10F of the transmission case 10 form a chamber that serves as an oil reservoir 28M and communicates with the opening 28T of the baffle plates, across the gap between the transmission case 10 and the baffle plate 28.

The pair of ribs 28Ra, 28Rb have a complementary mating surface 28F that comes into liquid-tight contact with the mating surface including the top surfaces of the pair of ribs 10F of the lubricating oil guide groove 11 of the transmission case 10. The complementary mating surface 28F of the baffle plate 28 includes the annular mounting surface 28S that comes into liquid-tight contact with the annular inner surface 10S (see FIG. 2) of the transmission case 10 around the seating part 15 for the bearing 13.

In this embodiment, as shown in FIG. 1, the oil reservoir 28M is provided across the gap between the transmission case 10 and the baffle plate 28 on the upper side from the bearing 13 supporting the differential case 16, and the pair of baffle plates 28, 29 are mounted on the transmission case 10 that surround the part from the differential case 16 to the vicinity of the outer circumferential edge of the final driven gear 18 so as to receive the lubricating oil having passed through the inside of the bearing 13. Thus, the number of the parts can be reduced as the oil reservoir 28M for supplying the lubricating oil can be formed by the baffle plate 28 itself.

The oil drain hole 16P in the side surface of the differential case 16 allows the lubricating oil to be accumulated inside the differential case 16 even during a halt of the vehicle, which eliminates the need to secure a high level of the lubricating oil as a whole by communicating with the inside of the differential case as in the conventional structure.

Accordingly, as shown in FIG. 1, the oil level in the first space on the outside of the differential case 16 can be set to be lower than a level (L1) up to the differential case 16. Thus, the amount of lubricating oil agitated by the final driven gear 18 while the vehicle is traveling can be reduced, so that the resistance to motion can be reduced. Here, the oil level refers to the height level of lubricating oil from the bottom part 10B of the transmission case 10.

The level of lubricating oil on the outer side of the baffle plate 28 (between the baffle plate 28 and the transmission case 10; second space) is set to be equal to or higher than the level of the lowermost portion of the spigot cylinder of the differential case 16 on which the final driven gear 18 is mounted (equal to or higher than a level (L2) of the lowermost portion of the part of the outer circumferential surface of the differential case 16 on which the final driven gear 18 is mounted). Thus, the lubricating oil in the second space on the outer side of the baffle plate 28 reaches a level high enough for the final driven gear 18 to be completely immersed. On the other hand, since the lubricating oil in the second space is not agitated by the final driven gear 18, the resistance does not increase and the amount of lubricating oil as a heat mass can be secured.

As shown in FIG. 2, the mounting surfaces of the baffle plates 28, 29 mounted to the transmission case 10 are laid on the outer races of the bearings 13, 14 in the axial direction (brought into liquid-tight contact with the inner surface of the transmission case 10 at the circumferential edge of the outer race). Thus, it is possible to reduce leakage when supplying lubricating oil into the oil reservoir 28M, and to thereby improve the lubrication efficiency relative to the amount of lubricating oil.

While the embodiment of the present invention has been described in detail, various design changes can be made to the present invention within the scope of the gist of the invention.

The invention claimed is:

1. A lubricating structure for a differential device comprising:
   a differential case having a pair of inboard parts that rotatably support a pair of inboard shafts;
   a final driven gear mounted to the differential case;
   a transmission case housing the differential case and the final driven gear; and
   a pair of bearings that support the pair of inboard parts inside the transmission case, and support the final driven gear and the differential case such that the final driven gear and the differential case are rotatable relative to the transmission case around a rotational axis of the pair of inboard shafts, wherein
   the lubricating structure for supplying lubricating oil from the pair of inboard parts and the pair of bearings into the transmission case comprises a pair of baffle plates that are fixed to the transmission case so as to partition an internal space between the transmission case on one side and the differential case and the final driven gear on another side into a first space at a side of the differential case and the final driven gear and a second space at a side of the transmission case,
   each of the pair of baffle plates has an annular mounting surface that comes into liquid-tight contact with an inner surface of the transmission case around an outer race of the bearing, and an inner surface including a portion on the first space side that is enlarged in such a manner as to be similar in shape to outer surfaces of rotating bodies defined by trajectories of the differential case and the final driven gear being rotated around the rotational axis of the inboard shaft,
   the pair of baffle plates are configured such that an amount of lubricating oil accumulating in the first space is smaller than an amount of lubricating oil accumulating in the second space, and
   the differential case has a through-hole parallel to the rotational axis of the pair of inboard shafts, and the through-hole is provided at a position that a level of lubricating oil can be secured inside the differential case.

2. The lubricating structure for a differential device according to claim 1, wherein one of the pair of baffle plates has a rib that forms a chamber, serving as an oil reservoir, across the transmission case on an upper side of the pair of bearings, and the oil reservoir communicates with the pair of inboard parts and the pair of bearings.

3. The lubricating structure for a differential device according to claim 1, wherein the amount of lubricating oil accumulating in the first space is set to an amount that a oil level in the first space is lower than a level up to the differential case.

4. The lubricating structure for a differential device according to claim 1, wherein the inner surface of each of the pair of baffle plates, except for mounting bolt portions of the baffle plates, is a shape smooth and even along the shapes of the differential case and the final driven gear.

5. The lubricating structure for a differential device according to claim 1, wherein a clearance between each of the pair of baffle plates and the differential case is 3 mm or less in nominal dimension.

6. The lubricating structure for a differential device according to claim 1, wherein a clearance between each of the pair of baffle plates and the final driven gear is 3 mm or less in nominal dimension.

7. The lubricating structure for a differential device according to claim 1, wherein a level of lubricating oil in the second space between the baffle plates and the transmission case is set to be equal to or higher than a level of a lowermost portion of a mount part of an outer circumferential surface of the differential case on which the final driven gear is mounted.

* * * * *